United States Patent Office 3,655,772
Patented Apr. 11, 1972

3,655,772
NAPHTHYL AND ANTHRACENYL BUTENYL SULFONES
Charles H. Chang, Piscataway, N.J., and David I. Randall, Easton, Pa., assignors to GAF Corporation, New York, N.Y.
No Drawing. Continuation-in-part of application Ser. No. 605,622, Dec. 29, 1966. This application Dec. 24, 1969, Ser. No. 888,062
Int. Cl. C07c 147/08
U.S. Cl. 260—607 A   5 Claims

ABSTRACT OF THE DISCLOSURE

The reaction of 1,3-butadiene with polycyclic sulfonyl halides, and resulting products containing a nuclearly substituted —$SO_2CH_2CH$=$CHCH_2X$ group, X being halo, useful as herbicides, pesticides, and intermediates for dyes and the like.

---

This application is a continuation-in-part of our application Ser. No. 605,622 filed Dec. 29, 1966, now abandoned.

This invention relates to a new and improved method for reacting a fused ring polycyclic sulfonyl halide with 1,3-butadiene and to the novel products of such process.

The reaction of 1,3-butadiene with methanesulfonyl chloride and with benzene sulfonyl chloride have been reported in J.C.S. 4962 (1964) by Asscher and Vofsi. They employed liquid air to cool the reaction mixture so that air in the reactor could be evacuated by a vacuum pump without vaporizing butadiene and the methylene chloride employed as the reaction medium. The authors reported methylene chloride to be the only solvent for these addition reactions, used triethylamine hydrochloride and acetonitrile apparently as an assistant, complexing and/or solubilizing agent for the cupric chloride catalyst, and employed the disodium salt of ethylenediamine tetraacetic acid for the removal of the copper catalyst from the reaction medium.

These previously reported processes are subject to a number of disadvantages. In view of the specificity of the disclosures, it is not apparent that they would be operative with other organic sulfonyl chlorides. As a matter of fact, a number of such other organic sulfonyl chlorides are insoluble in methylene chloride, although it is recognized that optimum results are generally obtained when the reactants are soluble in the reaction medium. The use of liquid air and evacuation is a troublesome and relatively expensive procedure. Use of triethylamine hydrochloride and acetonitrile to assist, solubilize and/or complex the cupric chloride catalyst, and of a chelating agent such as ethylenediamine tetraacetic acid or its salts for removing the copper catalyst from the reaction mixture is likewise troublesome.

It is an object of this invention to provide a process which will not be subject to one or more of the above disadvantages. Another object of the invention is the provision of novel chemical compounds through use of the aforementioned process. Other objects and advantages will appear as the description proceeds.

The attainment of the above objects is made possible by our discoveries that the use of liquid air and evacuation was not necessary in the foregoing reactions, that the reactions could be carried out without exclusion of air, that copper catalyst could be removed from a methylene chloride reaction medium by evaporating volatiles, dissolving the residue in ether, and washing the ether solution with dilute acid, that methylene chloride was inoperative for reactions involving reactants such as organic sulfonyl chlorides insoluble in methylene chloride, that ether, N-methylpyrrolidone, and N,N-dimethylformamide or -acetamide constitute excellent solvents for these reactions because they dissolve the cupric chloride catalyst in addition to one or both reactants whether substituted or not and enable elimination of triethylamine-HCl and acetonitrile, and that these improved solvents further permit removal of the copper catalyst from the reaction mixture with minimal decomposition of the reaction product and without the troublesome use of a chelating agent.

The invention accordingly comprises a method of reacting an organic sulfonyl halide of the formula

wherein X is Cl or Br; Ar is a naphthalene, anthracene or similar fused polycyclic aromatic nucleus; Y is Cl, Br, nitro, —$COR^1$, —$NR^2R^3$, or R; $R^1$ is H, X, —OH, R or —OR; $R^2$ is H, R or —COR; $R^3$ is H or R; R is phenyl or 1 to 6 carbon alkyl or cycloalkyl; and $n$ has a value of 0 to 5, with 1,3-butadiene without exclusion of air. As a further improvement, the invention comprises carrying out the aforementioned process in an ether, N-methylpyrrolidone, or N,N-dimethyl-formamide or -acetamide reaction medium. When employing ether as the reaction medium, the catalyst is readily removed therefrom upon completion of the reaction by washing with dilute HCl or other acid. When using the water soluble N-methylpyrrolidone, N,N-dimethylformamide or N,N-dimethylacetamide as the reaction medium, removal of copper catalyst and recovery of the desired reaction product are readily accomplished by drowning the final reaction mixture in water to precipitate the reaction product which may then be separated by filtration.

The novel compounds of the present invention are those of the formula (I)   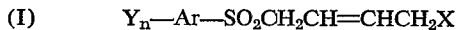

wherein X, Ar, Y, and $n$ have the values given above.

In the above formulae, alkyl and cycloalkyl refer to any such saturated straight or branched radical of 1 to 6 carbon atoms including methyl to hexyl, cyclopentyl and cyclohexyl; and $R^2$ and $R^3$, and Y (when $n$ is more than 1) may be the same or different.

Representative compounds of the invention include those of the above Formula I wherein X is Cl and $Y_n$—Ar is 1-naphthyl,
2-naphthyl,
1-(4'-chloro)naphthyl,
2-(3'-chloro)naphthyl,
2-(5',8'-dinitro)naphthyl,
2-(1',5'-dinitro)naphthyl,
1-(3'-bromo-4'-nitro)naphthyl,
2-(3'-carboxy)naphthyl,
1-(4',5',6',7',8'-pentachloro)naphthyl,
2-(3'-carbethoxy-4'-chloro)naphthyl,
1-(4'-acetamido)naphthyl,
1-(4'-N-hexylacetamido)naphthyl,
3-(2'-N-methylbutanoylamido)naphthyl,
1-(4'-amino)naphthyl,
1-(4'-N-propylamino)naphthyl,
2-(3'-chlorocarbonyl)naphthyl,
1-(4'-N,N-dimethylamino)naphthyl,
1-(8'-benzamido)naphthyl,
2-(3'-phenylcarbonyl)naphthyl,
2-(3'-ethylcarbonyl)naphthyl,
2-(3'-formyl)naphthyl,
1-(4'-N-phenylamino)naphthyl,
1-(4'-methyl)naphthyl,
1-(2'-isobutyl-7'-nitro)naphthyl,
1-(4'-cyclohexyl)naphthyl,
1-(5'-chloro-8'-cyclopentyl)naphthyl, the corresponding substituted anthracenyl radicals in addition to 1-anthracenyl and 2-anthracenyl, and the like, and the corresponding compounds wherein X is Br.

Compounds of the above Formula I are prepared by reaction in a suitable reaction medium of an organic sulfonyl halide of the formula $Y_n$—Ar—$SO_2X$ with an approximately equimolar amount of 1,3-butadiene wherein the variables have the values given above, without exclusion of air in the presence of cupric chloride catalyst with triethylamine hydrochloride and acetonitrile as catalyst modifiers-assistants-solvents where required. The catalyst is employed in the usual proportions approximating 0.02 to 2% based on the weight of the sulfonyl halide reactant. When ether, N-methylpyrrolidone or N,N-dimethyl-formamide or -acetamide is employed as solvent, the use of the triethylamine hydrochloride and acetonitrile is dispensed with, thus constituting a further advantage in using these solvents as reaction media herein. A still further advantage in the use of ether, N-methylpyrrolidone or N,N-dimethyl-formamide or -acetamide as the reaction medium in the present process resides in the facility of recovery and purification with diminished or minimal decomposition of the desired reaction product. Temperatures during the reaction may range from room temperature to the boiling point of the reaction medium, elevated temperatures ranging from about 70 to 110° C. being preferred. Super atmospheric pressures are often desirable, or at least use of pressure tight reaction vessels, particularly when using a volatile solvent such as ether as the reaction medium.

The reaction products described herein are characterized by the presence therein of a radical containing a highly reactive bromine or chlorine atom (X) activated by the adjacent vinyl sulfone linkage. As such, they are highly useful as reactants and intermediates in the production of other compounds and functional agents, in addition to being per se useful as effective herbicides against aquatic weeds and other plant life, pesticides, and the like.

Thus, the products of this invention are effective against aquatic weeds such as duckweed, salvinia, elodea, and potamogeton and the like when added to aqueous bodies containing them in concentrations of about 1 to 15, and generally about 10, p.p.m. (parts per million). In some instances, use of a water miscible mutual solvent such as acetone, alcohol or N-methylpyrrolidone may be employed to facilitate application.

Those products containing another reactive or potentially reactive radical as or in the Y group capable of reacting with a dyestuff molecule are further useful as intermediates in the production of fiber-reactive dyestuffs of any desired type, the reactive group in the resulting dyestuff being that part of the compounds of Formula I above bonded to the $Y_n$—Ar group. By way of example, the reaction product of Example 4 below containing a —COCl radical as the Y moiety may be reacted with an azo, anthraquinone, phthalocyanine or other type dyestuff containing an amino group, with liberation of HCl, to yield a fiber-reactive dyestuff characterized by the presence therein of the reactive grouping of the compounds of the present invention. The resulting dyestuffs containing at least one fiber-reactive 4-halo-2-butenylsulfonyl group of the formula —$SO_2CH_2CH=CHCH_2X$, and methods for their production from the compounds disclosed and claimed herein are disclosed in our co-pending application Ser. No. 605,627 entitled "Fiber-Reactive Dyestuffs" and filed on Dec. 29, 1966.

The following examples are only illustrative of this invention and are not to be regarded as limitative. All parts and proportions referred to herein and in the appended claims are by weight unless otherwise indicated.

(A) In the examples, when methylene chloride is used as solvent, the volatile material is removed under aspirator vacuum at 40° C. after completion of the reaction. The residue is dissolved in ether and the solution washed with three 50 ml. portions of 3 N HCl and finally with water to remove copper catalyst. The washed ether solution is dried with anhydrous sodium sulfate and decanted. The ether solution after decantation is evaporated under reduced pressure (aspirator) on a steam bath to give the desired product.

(B) When ether is used as solvent, triethylamine hydrochloride and acetonitrile are eliminated, and the final reaction medium washed directly with dilute HCl in a separatory funnel to remove copper catalyst, followed by the remainder of the procedure (A). Alternatively, the final reaction medium can be simply evaporated to dryness if the presence of copper catalyst in the product is unobjectionable.

(C) When N-methylpyrrolidone, N,N-dimethylformamide or N,N-dimethylacetamide are employed as solvent, triethylamine hydrochloride and acetonitrile are eliminated, the final reaction medium is directly poured into 200 ml. of cold water with stirring and the desired precipitated product collected by filtration, washed with water and if desired after recrystallization from chlorobenzene, dried in a vacuum oven at 40° C.

(D) In the examples summarized in the following Table I, a mixture of 0.1 mole of the indicated sulfonyl chloride, 0.2 mole of 1,3-butadiene, 30 ml. of the indicated solvent, and catalyst is heated at 100° C. for 3 hours in a sealed glass tube, or pressure bottle, without exclusion of air. The catalyst is cupric chloride ($CuCl_2$) employed in proportions of about 0.5–1.5% by weight of the sulfonyl chloride, together with, when the solvent is methylene chloride, an approximately equal amount of triethylamine hydrochloride and about 5 or 10% of acetonitrile ($CH_3CN$) by weight of the sulfonyl chloride. When these latter two materials are omitted with methylene chloride as solvent, yields are reduced by 50–75%. Radical /E/ in the product formulae is —$SO_2CH_2CH=CHCH_2Cl$ Structures of the products are supported by infrared (IR) analysis showing absorptions at 7.75μ and 8.82μ which are characteristic of sulfone groups.

TABLE I.—REACTION MIXTURE

| Example | Sulfonyl chloride | Solvent | Product |
|---|---|---|---|
| 1 | ⬡⬡—$SO_2Cl$ | Ether | ⬡⬡—/E/ |
| 2 | Same as above | N-methyl pyrrolidone | Same as above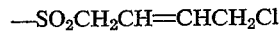 |
| 3 | NH—$COCH_3$ ⬡⬡ $SO_2Cl$ | $HCON(CH_3)_2$ | NH—$COCH_3$ ⬡⬡ /E/ |

3,655,772

TABLE I—Continued

| Example | Sulfonyl chloride | Solvent | Product |
|---|---|---|---|
| 4 | naphthalene with COCl and SO₂Cl | CH₂Cl₂ | naphthalene with COCl and /E/ |
| 5 | naphthalene with COOH and SO₂Cl | N-methyl pyrrolidone | naphthalene with COOH and /E/ |
| 6 | naphthalene with SO₂Cl, Cl, NO₂ | CH₂Cl₂ | naphthalene with /E/, Cl, NO₂ |
| 7 | naphthalene with SO₂Cl and SO₂Cl | Ether | naphthalene with /E/ and /E/ |
| 8 | anthracene with SO₂Cl | HCON(CH₃)₂ | anthracene with /E/ |
| 9 | naphthalene with SO₂Cl and NHCOCH₃ | CH₃CON(CH₃)₂ | naphthalene with /E/ and NHCOCH₃ |
| 10 | naphthalene with Br, Br, SO₂Cl | Ether | naphthalene with Br, Br, /E/ |
| 11 | anthracene with NO₂ and SO₂Cl | CH₂Cl₂ | anthracene with NO₂ and /E/ |
| 12 | naphthalene with NHCH₃ and SO₂Cl | N-methyl pyrrolidone | naphthalene with NHCH₃ and /E/ |
| 13 | naphthalene with CO-cyclohexyl and SO₂Cl | HCON(CH₃)₂ | naphthalene with CO-cyclohexyl and /E/ |
| 14 | naphthalene with COC₂H₅ and SO₂Cl | CH₃CON(CH₃)₂ | naphthalene with COC₂H₅ and /E/ |

TABLE I—Continued

| Example | Sulfonyl chloride | Solvent | Product |
|---|---|---|---|
| 15 | anthraquinone-SO₂Cl | N-methyl pyrrolidone | anthraquinone-/X/ |
| 16 | anthraquinone-SO₂Br | ...do... | anthraquinone-/E/ |
| 17 | dihydroxyanthraquinone-SO₂Cl | ...do... | dihydroxyanthraquinone-/E/ |
| 18 | dinitro-dihydroxy-anthraquinone with ClO₂S- and -SO₂Cl | ...do... | corresponding /E/ product |

This invention has been disclosed with respect to certain preferred embodiments, and it will be understood that modifications and variations thereof will become obvious to persons skilled in the art and are intended to be included within the spirit and purview of this application and the scope of the appended claims.

We claim:
1. A compound of the formula

$$Y_n\text{—Ar—}SO_2CH_2CH\text{=}CHCH_2X$$

wherein
X is Cl or Br;
Ar is a naphthalene, anthracene, nucleus;
Y is Cl, Br, nitro, or R;
R is phenyl or 1 to 6 carbon alkyl or cycloalkyl; and
n has a value of 0 to 5.

2. A compound as defined in claim 1 wherein X is Cl and $Y_n$—Ar— is 1-naphthyl.
3. A compound as defined in claim 1 wherein X is Cl and $Y_n$—Ar— is 2-naphthyl.
4. A compound as defined in claim 1 wherein X is Cl and $Y_n$—Ar— is 1-anthracenyl.
5. A compound as defined in claim 1 wherein X is Cl and $Y_n$—Ar is 2-anthracenyl.

FOREIGN PATENTS 1,409,516  7/1965  France _____ 260—607 A

ALEX MAZEL, Primary Examiner

D. R. PHILLIPS, Assistant Examiner

U.S. Cl. X.R.

71—103; 260—144, 370, 470, 544 M, 558 S, 562 P, 576, 578, 590, 591, 592, 599; 424—308, 317, 325, 331, 333, 337